United States Patent Office 3,377,401
Patented Apr. 9, 1968

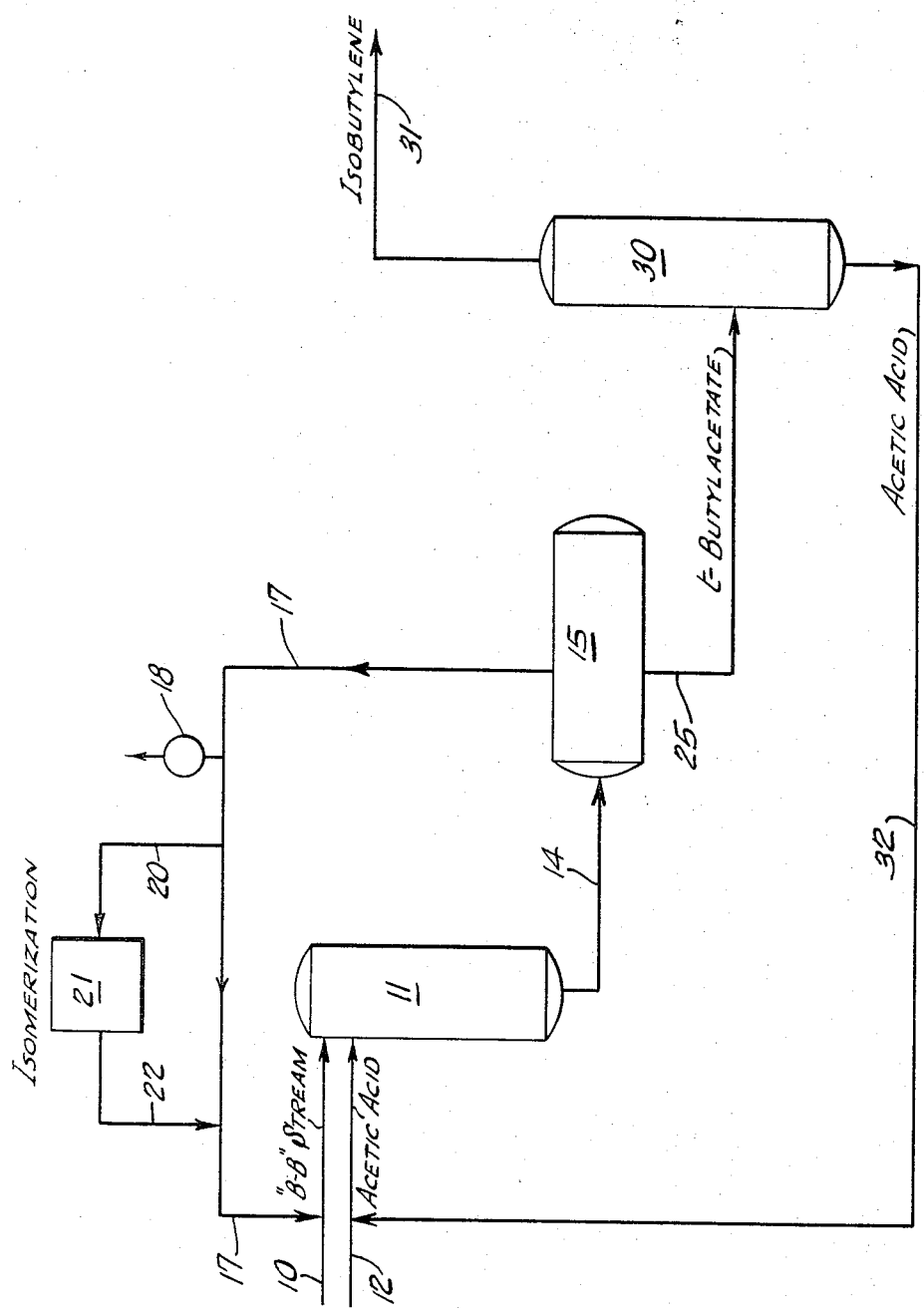

3,377,401
PROCESS FOR SEPARATING ISOBUTYLENE FROM A HYDROCARBON STREAM
Stanley R. Newman, Fishkill, George W. Eckert, Wappingers Falls, Howard V. Hess, Glenham, and Robert Y. Heisler, Wappingers Falls, N.Y., assignors to Texaco Inc., New York, N.Y., a corporation of Delaware
Continuation-in-part of application Ser. No. 830,083, July 28, 1959. This application Nov. 17, 1965, Ser. No. 508,324
13 Claims. (Cl. 260—677)

The subject application is a continuation-in-part of Ser. No. 830,083, filed July 28, 1959, now abandoned.

This invention relates to a process for recovering pure isobutylene from a mixture of $C_4$ hydrocarbons. More particularly, it involves a process for treating a mixture of $C_4$ hydrocarbons so as to remove selectively isobutylene in the form of a tertiary butyl ester which is then decomposed to yield pure isobutylene.

Pure isobutylene is in demand for the preparation of butyl rubber and liquid polyisobutylenes which are widely used in the manufacture of lubricant additives and also as a starting material for isoprene manufacture by a series of reactions involving condensation of formaldehyde and isobutylene to yield a dioxane which is decomposed to form isoprene. Present procedures for the manufacture of isobutylene do not yield a product of the desired purity without additional treatment such as expensive fractional distillation. One commercial procedure for obtaining isobutylene involves the treatment of a $C_4$ refinery stream comprising n-butane, isobutane, n-butenes and isobutylene—also called a "B—B" stream—with cold sulfuric acid which preferentially extracts isobutylene; on heating the isobutylene-containing sulfuric acid extract phase, the isobutylene polymerizes and is recovered therefrom as diisobutylene which on cracking yields isobutylene monomer. This method of obtaining isobutylene from a $C_4$ hydrocarbon stream has the disadvantage that the isobutylene thus produced contains as impurities some n-butenes and butadiene. The process of this invention provides a method of recovering pure isobutylene from a $C_4$ hydrocarbon mixture through the intermediate formation and decomposition of a t-butyl ester of a monocarboxylic acid.

The process of this invention involves contacting a $C_4$ hydrocarbon mixture containing isobutylene with a hydrocarbyl monocarboxylic acid in a reaction zone under conditions adapted for the formation of the t-butyl ester of the monocarboxylic acid to the exclusion of the corresponding primary and secondary butyl esters, separating unreacted $C_4$ hydrocarbons from the t-butyl ester-containing reaction mixture and subjecting the $C_4$ hydrocarbon-free t-butyl ester reaction mixture to thermal treatment whereby t-butyl ester decomposes to form a hydrocarbyl monocarboxylic acid and pure isobutylene. The hydrocarbyl monocarboxylic acid formed on decomposition of the t-butyl ester is normally recycled to prepare additional quantities of t-butyl ester by contact with the isobutylene-containing $C_4$ hydrocarbon mixture. Similarly, at least a portion of the unreacted $C_4$ hydrocarbon separated from the t-butyl ester reaction mixture is advantageously recycled to the ester-forming reaction step to separate unreacted isobutylene therefrom. Prior to recycle, the unreacted $C_4$ gas stream is advantageously subjected to an isomerization step to form additional quantities of isobutylene.

A major advantage of the process of the invention over prior art methods of separating isobutylene from $C_4$ hydrocarbon mixtures is the higher purity of the resulting isobutylene.

Another advantage resides in the fact that it is effected with a minimum of power requirements since low temperatures favor both the preferential formation of t-alkyl esters to the exclusion of primary and secondary esters and the decomposition of the t-alkyl esters over the decomposition of the primary and secondary esters which may accumulate in the system.

The mixture of $C_4$ hydrocarbons employed in the process of the invention is normally obtained as a by-product of a refinery process such as catalytic cracking, thermal cracking and catalytic reforming. A typical $C_4$ hydrocarbon mixture obtained as a by-product of fluid catalytic cracking comprises 45–60 mol percent n- and iso-butanes, 10–25 mol percent isobutylene and 15–45 mol percent n-butenes. A mixture of $C_4$ hydrocarbons—usually called a B—B stream—obtained from any refinery process or a blend of $C_4$ hydrocarbon mixtures from different refining processes is employed in the process of this invention.

The hydrocarbyl monocarboxylic acid employed in the process of the invention has the formula RCOOH wherein R is a hydrocarbyl radical containing 1–17 carbon atoms and is preferably an aliphatic hydrocarbyl radical containing 1–7 carbon atoms. Hydrocarbyl monocarboxylic acids containing 1–18 carbon atoms including aryl monocarboxylic acids, aliphatic monocarboxylic acids, cycloaliphatic monocarboxylic acids, alkaryl and aralkyl monocarboxylic acids are effective in the process of the invention. Acetic acids has proved particularly useful in the process of the invention and is the preferred agent for the ester-forming step from the standpoints of availability and cost. The contemplated large scale use of t-butyl acetate as an octane appreciator, a development recently announced by the assignee of the instant invention, is another reason why acetic acid is the preferred agent in the isobutylene recovery process of the invention.

The monocarboxylic acid is advantageously present in the ester-forming step in an excess over the amount required for complete reaction with the isobutylene fraction of the $C_4$ hydrocarbon mixture. The mol ratio of monocarboxylic acid, preferably acetic acid, to isobutylene present in the $C_4$ hydrocarbon mixture is maintained broadly between about 1.2:1 and 3:1. Lower and higher mol ratios may be used but lower ratios are less efficient in removing isobutylene from a B—B stream and higher ratios create an acid handling problem. The desired mol ratio of acid to isobutylene component of the $C_4$ hydrocarbon mixture is simply maintained by recycling acid from the decomposition of the t-butyl ester.

The ester-forming step can be represented by the following equation using acetic acid as the monocarboxylic acid reactant:

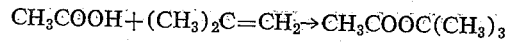

Contact of the B—B stream with a monocarboxylic acid to form the t-butyl ester to the exclusion of secondary esters is effected in the liquid phase at a temperature between 40 and 300° F. and at a pressure between 40 and 300 p.s.i.g. The temperature employed within the 40 to 300° F. range depends upon the catalyst and employed in the ester-forming reaction. The pressure range selected is sufficient to maintain essentially liquid phase operation and of course varies with the temperature level of the ester-forming reaction. As a general proposition, however, the preferred pressure range falls between about 50 and 150 p.s.i.g. The maintenance of liquid phase conditions in the ester-forming step coupled with the judicious selection of temperatures and pressures falling within the above broad ranges assures the formation of the t-butyl ester to the substantial exclusion of the secondary butyl isomer.

The most commonly employed catalysts for the ester-forming reaction are acid condensation catalysts such as sulfuric acid, phosphoric acid and organic substituted derivatives thereof containing at least one acidic hydrogen atom such as benzene sulfonic acid, alkyl sulfates, monoalkyl dihydrogen phosphates and other strong, non-volatile mineral and organic acids. The acid-catalyzed ester-forming reaction is effected at a temperature between about 50 and 160° F. and preferably at pressures between 50 and 150 p.s.i.g. Higher reaction temperatures with these strong acid catalysts result in the formation of a large amount of secondary butyl esters.

The concentration of strong mineral acid or organic acid condensation catalyst in the ester-forming reaction is usually between 0.1 and 5.0 weight percent of the reaction mixture comprising acid and $C_4$ hydrocarbon mixture. In our commonly-assigned U.S. Patent 3,055,934, issued Sept. 25, 1962 to R. Y. Heisler, H. V. Hess, G. W. Eckert and L. E. Ruidisch, there is disclosed a preferred procedure for effecting liquid phase reaction of acids with tertiary olefins to prepare t-alkyl esters to the substantial exclusion of the formation of the secondary alkyl esters. The procedure of this patent is advantageously employed in the ester-forming step of the process of the invention.

Employing the process of the afore-identified patent in the ester-forming step, the B—B stream is contacted with monocarboxylic acid in a continuous liquid phase reaction in the presence of 0.5 to 2.5 weight percent sulfuric acid at a temperature between 95 and 160° F. and a pressure above about 50 p.s.i.g. and preferably between 75 and 150 p.s.i.g. which pressure is sufficient to maintain the reaction mixture in the liquid phase; the reactants are maintained in the reaction zone for an average residence time of about 15 to 120 minutes to form a liquid phase reaction mixture comprising t-butyl ester, excess monocarboxylic acid and sulfuric acid catalyst which is continuously withdrawn from the reaction zone.

In addition to the acid-catalyzed procedure for preparing t-butyl ester, a heterogeneous condensation reaction may be used to form t-butyl ester to the exclusion of the secondary butyl isomer. In this heterogeneous condensation reaction, which is the subject matter of a commonly-assigned U.S. Patent 3,096,365, issued July 2, 1963 to R. Y. Heisler, H. V. Hess, G. W. Eckert and M. C. Throckmorton, reaction of the B—B stream with monocarboxylic acid is effected in the liquid phase at a temperature between 75 and 300° F. and preferably between 100 and 250° F., a pressure between 50 and 300 p.s.i.g. and by contact with a Period 3 polyvalent metal silicate. Employing the process of this patent for the ester-forming step, the B—B stream and the monocarboxylic acid are passed in the liquid phase over magnesium silicate, aluminum silicate or a mixture of magnesium and aluminum silicates at a temperature between about 100 and 250° F. and at a pressure preferably between 75 and 150 p.s.i.g. The solid Period 3 polyvalent metal silicate catalyst used in the heterogeneous process comprises from about 10–40 weight percent of the Period 3 metal oxide and 60–90 weight percent silica.

The reaction product from the t-butyl ester-forming reaction step comprises t-butyl ester of monocarboxylic acid, usually t-butyl acetate, excess monocarboxylic acid and unreacted $C_4$ hydrocarbons including normal isobutane, n-butenes and a small proportion of unreacted isobutylene. This product is passed to a flash drum where the unreacted $C_4$ gases are removed by pressure reduction to a level of 0 to 30 p.s.i.g. while maintaining the temperature between 50 and 130° F. Complete removal of the unreacted gases is rapidly effected in the flash drum by reducing the pressure and maintaining the temperature within the prescribed range. The unreacted gases are recycled at least in part to the ester-forming reaction to recover unreacted isobutylene therefrom.

After the unreacted $C_4$ hydrocarbons have been separated from the reaction product, the product mixture comprising t-butyl ester and carboxylic acid is raised to a temperature between 100 and 510° F. in the decomposition zone, the temperature employed depending on the means employed to effect the thermal decomposition of the ester. The decomposition of the t-butyl ester is advantageously effected at atmospheric pressure although pressure as high as about 30 p.s.i.g. can be used. Atmospheric pressure is preferred for the decomposition since the desired decomposition to isobutylene and carboxylic acid produces two volumes of product from one volume of t-butyl ester.

The preferred method for effecting decomposition of the t-butyl ester comprises heating the ester in the presence of 0.05 to 6.0, and preferably 0.1 to 2.0 weight percent, non-volatile, strong mineral acid or organic acid to a temperature between 100 and 200° F. The thermal decomposition in the presence of a prescribed small amount of non-volatile, strong mineral acid proceeds rapidly and smoothly at temperatures between 100 and 200° F. to give pure isobutylene and carboxylic acid. For example, a mixture comprising t-butyl acetate, acetic acid and sulfuric acid in a concentration equivalent to 0.1 weight percent of the t-butyl acetate component of the reaction mixture decomposes at a pot temperature of about 138° F. to give acetic acid and pure isobutylene.

Other non-volatile, strong mineral acids and strong organic acids useful in catalyzing the thermal decomposition are identical with those that can be used for condensation of the isobutylene component of the B—B stream with a monocarboxylic acid in the ester-forming step. These acids are o-phosphoric acid, benzene sulfonic acid, alkyl sulfates, alkyl hydrogen phosphates and toluene sulfonic acid. The preferred procedure for effecting decomposition of the t-butyl ester in the presence of non-volatile, strong mineral or organic acid is described in more detail in the commonly-assigned U.S. Patent 3,068,-305, issued Dec. 11, 1962.

In the procedure wherein t-butyl ester formation is effected in the presence of a strong, non-volatile mineral acid or organic acid, the strong acid present in the product mixture serves as a catalyst for the decomposition of the t-butyl ester into pure isobutylene and carboxylic acid. If desired, the mineral acid concentration can be reduced to the preferred concentration level of 0.1 to 2.0 percent by water washing the t-butyl ester-containing reaction product after separation of the unreacted $C_4$ hydrocarbons therefrom.

Decomposition of the t-butyl ester can also be effected non-catalytically by heating the ester to temperatures between about 400 and 510° F. by passage over an inert material such as glass wool. In decomposition of the t-butyl ester by a non-catalytic procedure it is important to maintain the temperature of decomposition below about 510° F. to prevent contamination of the resulting isobutylene by acetone and n-butenes. An effective means of decomposition is passage of t-butyl ester such as t-butyl acetate over glass wool at a temperature of about 450–500° F. at a liquid space velocity of 0.25 volumes of t-butyl acetate per reactor volume per hour. The isobutylene produced in such decomposition is free from acetone contaminant and is better than 98% pure isobutylene.

The process of the invention for separating pure isobutylene from a B—B stream is exemplified in the accompanying flow diagram which is described in detail as follows:

A B—B stream obtained from fluid catalytic cracking and containing approximately 16 weight percent isobutylene, 54 weight percent of a mixture of n- and iso-butanes and 30 weight percent of n-butenes is introduced through a pipe 10 into a reaction zone 11. Acetic acid is introduced into the reaction zone 11 through a pipe 12. Condensation of the isobutylene component of the B—B stream with the acetic acid to form t-butyl acetate is effected in the reaction zone 11 with 1.5–3.0 weight percent sulfuric acid basis the total reactant weight. The condensation reaction is effected at a temperature between 75 and 160° F. and at a pressure between 75 and 150 p.s.i.g. whereby t-butyl acetate is formed to the exclusion of the secondary butyl ester.

As indicated previously, the t-butyl ester-forming reaction can be effected in the reaction zone 11 by passage of the above reactants over solid aluminum silicate or magnesium silicate catalysts.

There is withdrawn from the reaction zone 11 through a pipe 14 a product mixture comprising t-butyl acetate, excess acetic acid, sulfuric acid catalyst and unreacted $C_4$ gases. This product mixture is introduced into the flash drum 15 wherein the pressure is reduced to atmospheric and the reaction mixture is maintained between 50 and 130° F.

The unreacted $C_4$ gases comprising n- and iso-butanes, n-butenes and 2 to 5 mol percent isobutylene, is removed from the flash drum 15 through a pipe 17. A major portion of this gas stream is recycled through the pipes 17 and 10 to the reaction zone 11 for further reaction with acetic acid to form t-butyl acetate. A vent pipe 18 provides means for withdrawing the unreacted $C_4$ hydrocarbon stream to prevent excess build-up of butanes and n-butenes in the reaction system.

The isobutylene content of the recycled gas stream is advantageously increased by contacting the recycle $C_4$ gas stream with conventional isomerization catalysts such as activated alumina, boria-alumina, molybdena-alumina, platinum-alumina, alumina-zirconia-silica and molybdena-boria-alumina at temperatures of 400 to 800° F. Isomerization of the $C_4$ mixture is effected by passing it through a pipe 20 into an isomerization zone 21 where it contacts a catalyst such as platinum-alumina at a temperature of 600–650° F. with a resulting conversion of n-butenes to isobutylene. After isomerization, the $C_4$ stream with an enriched content of isobutylene is recycled to the reaction zone 11 through pipes 22, 17 and 10.

The t-butyl ester reaction product freed from unreacted $C_4$ gases is withdrawn from the flash drum 15 through a pipe 25 and passed to decomposition zone 27. In the decomposition zone 27, a temperature between 100 and 510° F. and a pressure between 0 and 30 p.s.i.g. are maintained.

When the t-butyl ester reaction is effected with acid catalysis, the residual mineral acid concentration can, if desired, be reduced to the preferred acid concentration level of 0.1 to 2.0 weight percent by washing with about one volume of water per 3 to 5 volumes of reaction product in a wash zone, not shown.. The t-butyl acetate decomposes at a temperature of 130–165° F. to pure isobutylene and acetic acid in the presence of sulfuric acid. Pure isobutylene is obtained as an overhead fraction from the zone 30 through a pipe 31 and can be used as such in the manufacture of butyl rubber and liquid polyisobutylene for the manufacture of lubricant additives.

Acetic acid is withdrawn from the decomposition zone 30 through a pipe 32 and is recycled therethrough to the ester-forming reaction zone 11. If sulfuric acid has been used to catalyze the thermal decomposition, it is recycled to the reaction zone 11 alonge with the acetic acid to act as an ester-forming catalyst in the reaction zone 11.

The process of the invention is illustrated in the following examples:

Example 1

A mixture of 8.8 lbs. of acetic acid, 19.6 lbs. of B—B stream containing 20.8% isobutylene was charged to a reaction vessel maintained at 55° F. and 55 p.s.i.g. at a space velocity of 0.15 volume of reactant mixture per volume fo reactor space per hour. The reactant mixture comprised 2 mols of acetic acid per mol of isobutylene. Prior to the introduction of the reaction mixture the reactor had been charged with a mixture of 990 gms. of acetic acid and 110 gms. of 66° Bé. sulfuric acid to give a sulfuric acid concentration of 0.7 weight percent basis the total acetic acid B—B stream reaction mixture. The reaction mixture was stabilized at room temperature using a knock-back condenser temperature of 32° F. In Table 1 there are shown the compositions of the feed B—B stream and of the off-gas from the stabilization as determined by mass spectroscopy:

|  | Composition, Mol Percent Feed B-B Stream | Unreacted $C_4$ Stream from Stabilizer |
|---|---|---|
| Ethane | 0.2 |  |
| Propane | 4.3 | 1.8 |
| Propylene | 3.4 | 1.3 |
| Isobutane | 43.5 | 49.9 |
| n-Butane | 7.3 | 13.6 |
| Butylene-1 | 13.4 | 16.4 |
| Isobutylene | 20.8 | 7.7 |
| Trans-butylene-2 | 5.4 | 7.0 |
| Cis-butylene-2 | 1.7 | 2.3 |
| $C_5$ and heavier | 0.5 |  |

Analysis of a portion of the liquid product after washing with an equal volume of water, ½ volume of sodium hydroxide followed by another water wash and subsequent drying over Drierite indicated that the reaction product was essentially t-butyl acetate with a concentration of other esters basis total charge less than 0.1 weight percent.

A portion of t-butyl acetate-containing reaction product formed with sulfuric acid as the catalyst was charged to a reaction vessel fitted with a reflux column having a 20:1 reflux ratio. After stabilization, the concentration of sulfuric acid in the t-butyl acetate-containing product was approximately 5.3%. The mixture of t-butyl acetate and sulfuric acid was heated at atmospheric pressure to a pot temperature of 138° F. at which point substantial decomposition of the mixture was observed. An overhead fraction distilling at 19° F. (−7.2° C.) was condensed in a trap cooled with a Dry Ice-acetone mixture. Analysis of the overhead condensate proved it to be isobutylene of better than 99% purity. Vapor phase chromatographic analysis established that the only $C_4$ fraction in the overhead was isobutylene. Analysis of the residue indicated it to be acetic acid containing sulfuric acid which was suitable for recycle to form additional quantities of t-butyl acetate by contact with a B—B stream.

The necessity of using a temperature below about 510° F. for thermal decomposition of t-butyl esters is shown in Example 2.

Example 2

A sample of t-butyl acetate which had been freed of any residual traces of acid by water and caustic washing and subsequent drying was heated to a temperature of about 500° F. by passage through a hot tube packed with glass wool. An isobutylene fraction of approximately 98% purity was separated from the reaction product. Analysis of the isobutylene fraction separated from the reaction product shows the presence of approximately 0.7 weight percent butane, 1.1% carbon dioxide and 0.2% t-butanol. When a similar t-butyl acetate sample was heated to a temperature of about 550° F., the separated isobutylene fraction contained about 5.3 weight percent acetone indicating that there was substantial decomposition of the t-butyl acetate to products other than isobutylene and acetic acid. It is for this reason that an upper temperature limit of about 510° F. is placed on the decomposition of t-butyl acetate.

We claim:

1. A process for separating isobutylene from a mixture of $C_4$ hydrocarbons which comprises contacting said $C_4$ hydrocarbon mixture with a hydrocarbyl monocarboxylic acid in a reaction zone at a temperature between 40 and 300° F. and a presssure between 40 and 300 p.s.i.g. whereby a t-butyl ester of said monocarboxylic acid is formed to the exclusion of isomeric butyl esters, separating unreacted $C_4$ hydrocarbons from the resulting reaction mixture to form an acidic residue comprising said t-butyl ester and free monocarboxylic acid, heating said acidic residue at a temperature between 100 and 510° F. and at a pressure between atmospheric and 30 p.s.i.g. to decompose said t-butyl ester to monocarboxylic acid and isobutylene and separating said isobutylene from said monocarboxylic acid.

2. A process according to claim 1 in which said monocarboxylic acid has the general formula RCOOH in which R is a hydrocarbyl radical containing 1–17 carbon atoms.

3. A process according to claim 1 in which said monocarboxylic acid is an aliphatic hydrocarbyl monocarboxylic acid containing 2–8 carbon atoms.

4. A process according to claim 1 in which reaction of said monocarboxylic acid with said isobutylene containing $C_4$ hydrocarbon mixture is effected in the presence of 0.1 to 5.0 weight percent of a strong, non-volatile acid selected from the group consisting of mineral acids and organic acids at a temperature between 50 and 160° F. and a pressure between 50 and 150 p.s.i.g.

5. A process according to claim 1 in which separation of unreacted $C_4$ hydrocarbons from the reaction mixture comprising t-butyl ester and monocarboxylic acid is effected at a temperature between 50 and 130° F. and a pressure between atmospheric and 30 p.s.i.g.

6. A process according to claim 1 in which acidic residue is heated in the presence of 0.05 to 2.0 weight percent non-volatile, strong acid selected from the group consisting of mineral acids and organic acids to a temperature between 100 and 200° F. and atmospheric pressure to decompose said t-butyl ester.

7. A process according to claim 1 in which said acidic residue is heated to a temperature between 400 and 510° F. at atmospheric pressure to decompose the t-butyl ester.

8. A process for separating isobutylene from a mixture of $C_4$ hydrocarbons which comprises contacting said $C_4$ hydrocarbon mixture with a $C_2$–$C_8$ aliphatic hydrocarbyl monocarboxylic acid in an ester-forming reaction zone at a temperature between 50 and 160° F. and a pressure between 50 and 150 p.s.i.g. in the presence of 0.1 to 5.0 weight percent of a strong, non-volatile acid selected from the group consisting of mineral acids and organic acids, said conditions being adapted for the formation of a t-butyl ester of said monocarboxylic acid to the exclusion of the formation of isomeric butyl esters, separating unreacted $C_4$ hydrocarbons from the reaction product to form an acidic residue comprising said t-butyl ester, free monocarboxylic acid and said strong, non-volatile acid, heating said acidic residue to a temperature between 100 and 200° F. to decompose said t-butyl ester to monocarboxylic acid and isobutylene and separating said isobutylene from a mixture of monocarboxylic acid and strong, non-volatile acid.

9. A process according to claim 8 in which said strong, non-volatile acid is sulfuric acid.

10. A process according to claim 8 in which said mixture of monocarboxylic acid and strong mineral acid is recycled to said ester-forming reaction zone.

11. A process according to claim 8 in which at least a portion of said $C_4$ hydrocarbons separated from the product mixture is recycled to said ester-forming reaction zone.

12. A process according to claim 8 in which said unreacted $C_4$ hydrocarbons after separation from said product mixture are isomerized and are then recycled to said ester-forming reaction zone.

13. A process for separating isobutylene from a mixture of $C_4$ hydrocarbons which comprises contacting said $C_4$ hydrocarbon mixture with a hydrocarbyl monocarboxylic acid in a reaction zone in the liquid phase at a temperature between 100 and 250° F. and a pressure between 75 and 150 p.s.i.g. in the pressure of a solid Period 3 polyvalent metal silicate catalyst whereby a t-butyl ester of said moncarboxylic acid is formed to the exclusion of isomeric butyl esters, separating unreacted $C_4$ hydrocarbons from the resulting reaction mixture to form an acidic residue comprising said t-butyl ester and free monocarboxylic acid, heating said acidic residue at a temperature between 100 and 510° F. and at a pressure between atmospheric and 30 p.s.i.g. to decompose said t-butyl ester to monocarboxylic acid and isobutylene and separating said isobutylene from said monocarboxylic acid.

References Cited
UNITED STATES PATENTS 3,026,362    3/1962    McKeever _____ 260—677

HERBERT LEVINE, *Primary Examiner.*

ALPHONSO D. SULLIVAN, *Assistant Examiner.*